United States Patent
Shim

(10) Patent No.: US 8,437,089 B2
(45) Date of Patent: May 7, 2013

(54) ZOOM LENS SYSTEM

(75) Inventor: Hyung-rok Shim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 13/227,204

(22) Filed: Sep. 7, 2011

(65) Prior Publication Data

US 2012/0206818 A1    Aug. 16, 2012

(30) Foreign Application Priority Data

Feb. 11, 2011  (KR) .................. 10-2011-0012464

(51) Int. Cl.
*G02B 15/14* (2006.01)

(52) U.S. Cl.
USPC .......................................... 359/687

(58) Field of Classification Search .......... 359/687, 359/683

See application file for complete search history.

(56) References Cited

U.S. PATENT DOCUMENTS

| 5,963,378 | A | 10/1999 | Tochigi et al. |
| 6,975,462 | B2* | 12/2005 | Mihara .................. 359/687 |
| 7,173,769 | B2 | 2/2007 | Park |
| 7,215,486 | B2* | 5/2007 | Mihara .................. 359/687 |

FOREIGN PATENT DOCUMENTS

| JP | 8-248318 A | 9/1996 |
| JP | 2003-202500 A | 7/2003 |
| JP | 3570253 A | 7/2004 |
| JP | 2009-53326 A | 3/2009 |
| KR | 10-2006-0106435 A | 10/2006 |
| KR | 10-2009-0010881 A | 1/2009 |
| KR | 10-0975296 B1 | 8/2010 |

* cited by examiner

Primary Examiner — Scott J Sugarman
(74) Attorney, Agent, or Firm — Sughrue Mion, PLLC

(57) ABSTRACT

A zoom lens system including, in an order from an object to an image: a first lens group including at least one lens, and a refraction member for bending an optical axis, and having positive refractive power; a second lens group having negative refractive power; a third lens group; and a fourth lens group, wherein zooming is performed by changing at least one interval between the first through fourth lens groups.

20 Claims, 14 Drawing Sheets

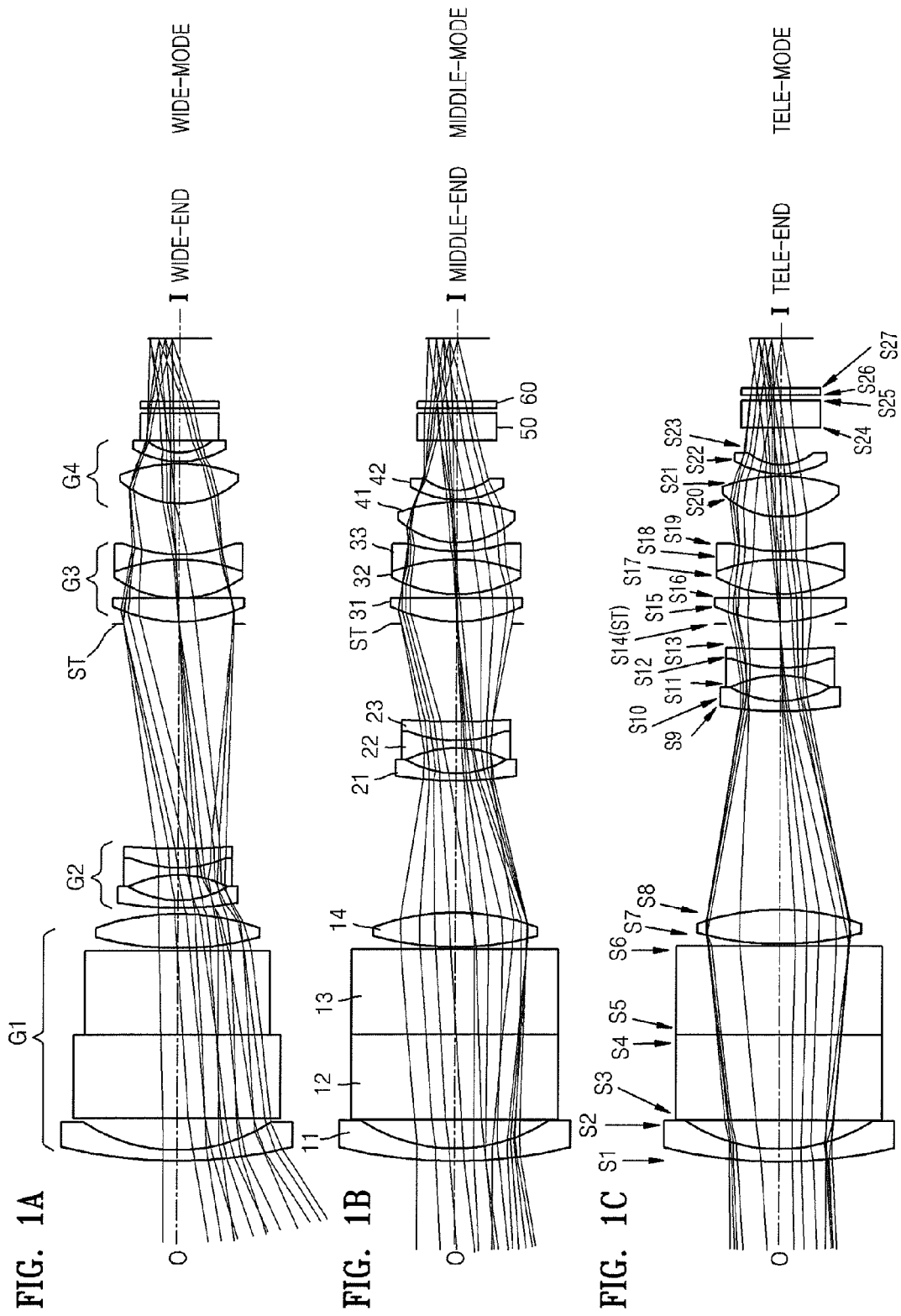

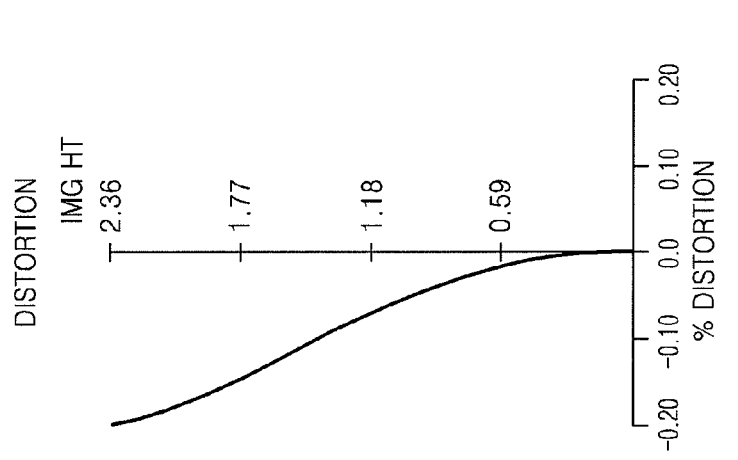
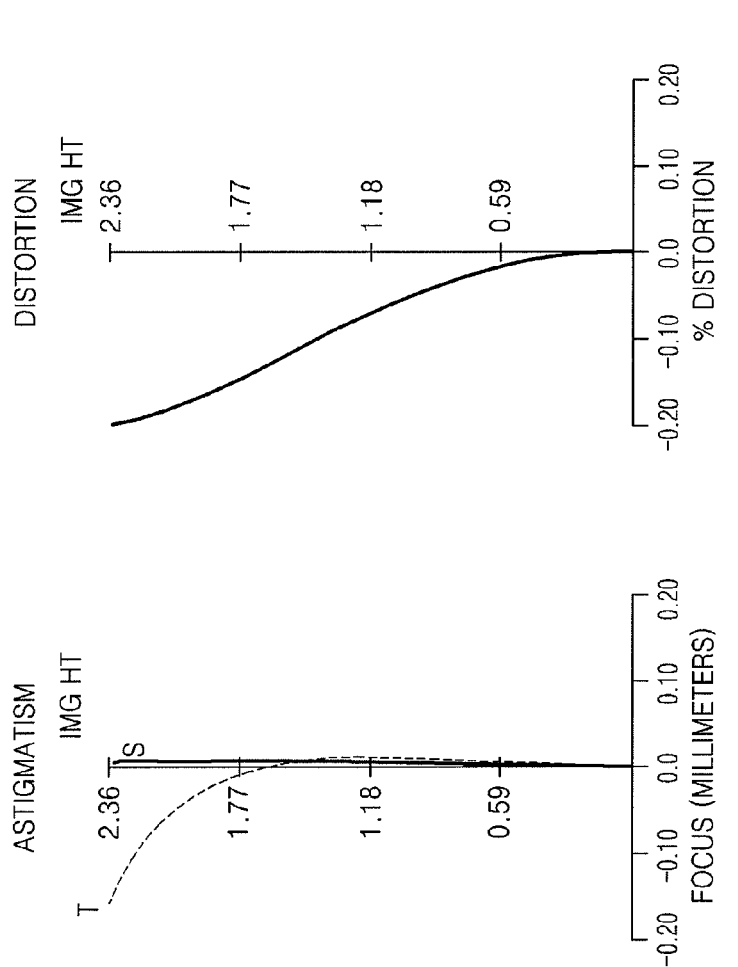
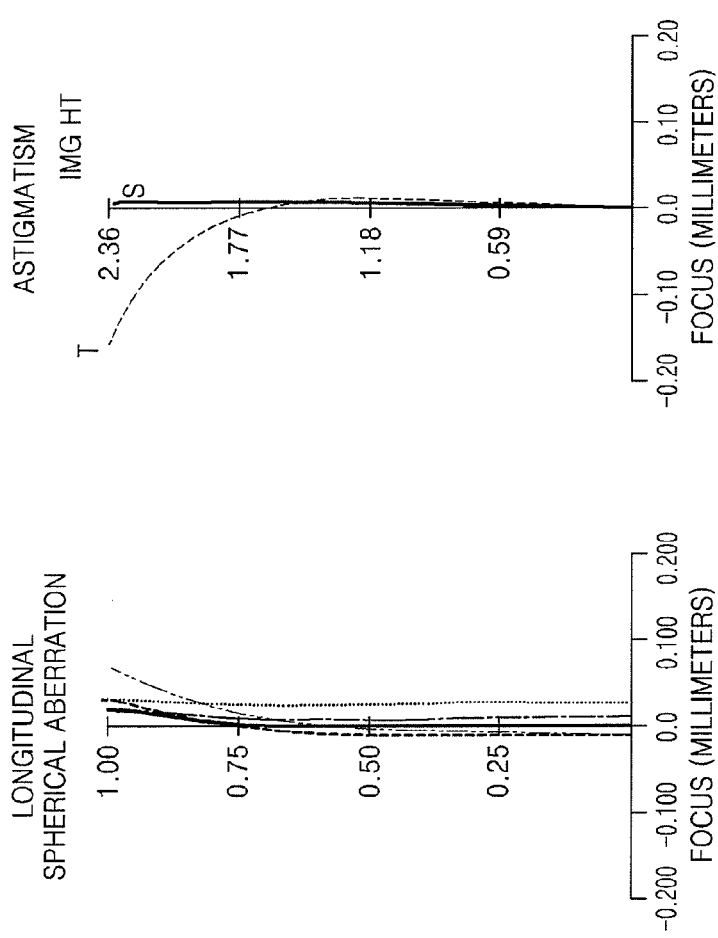

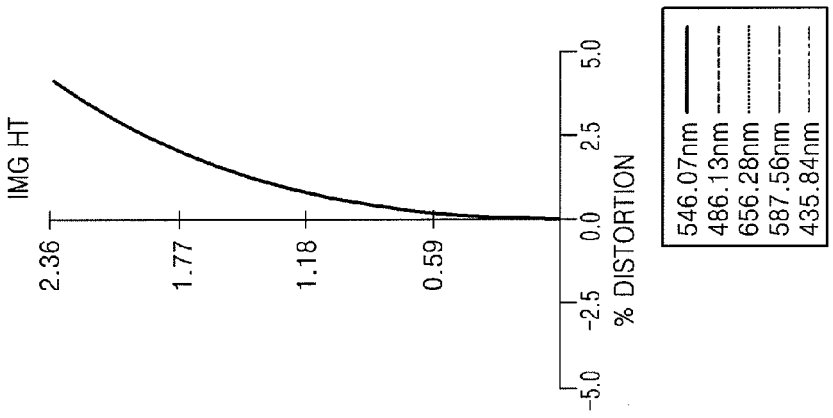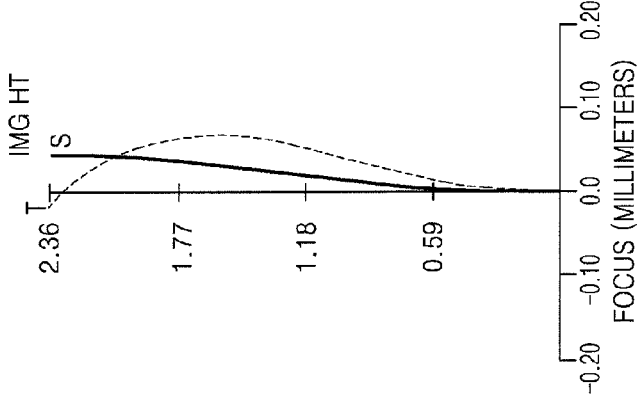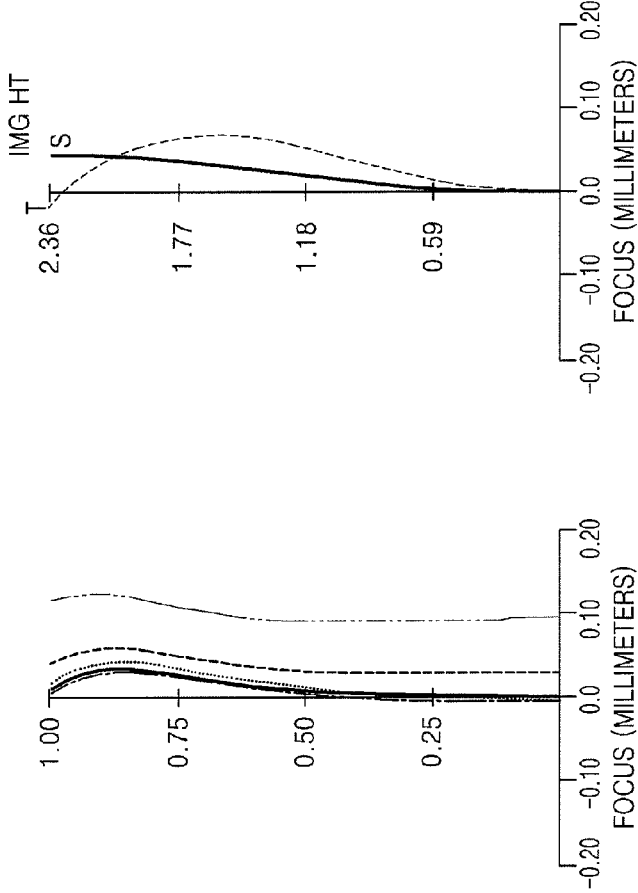

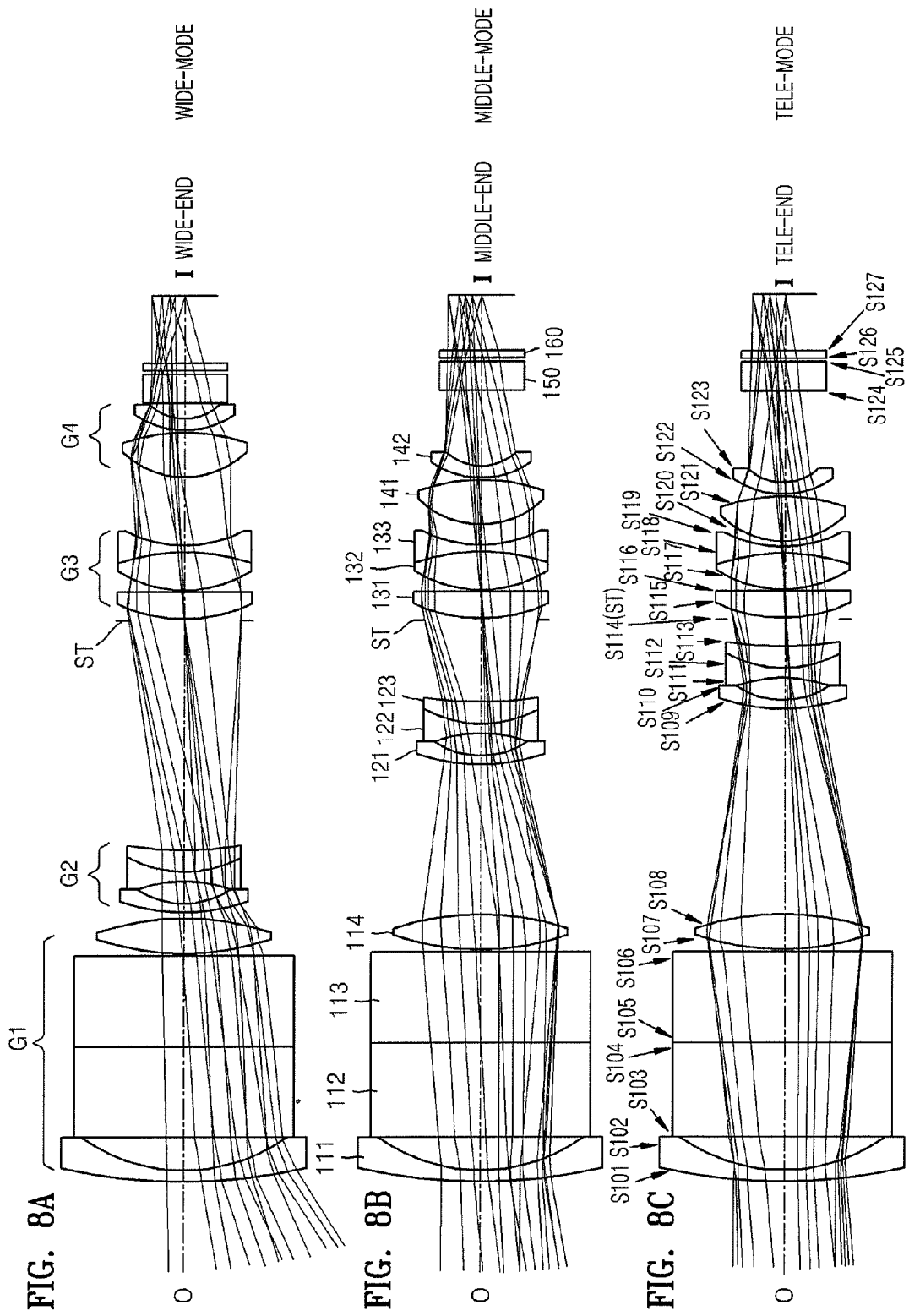

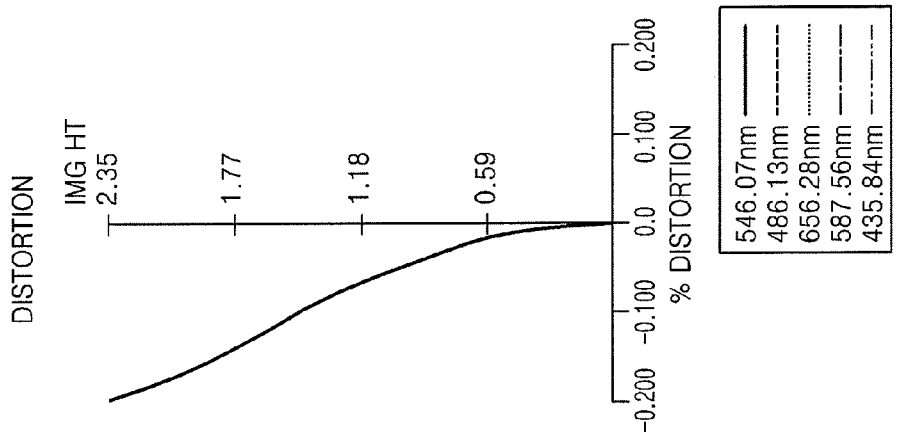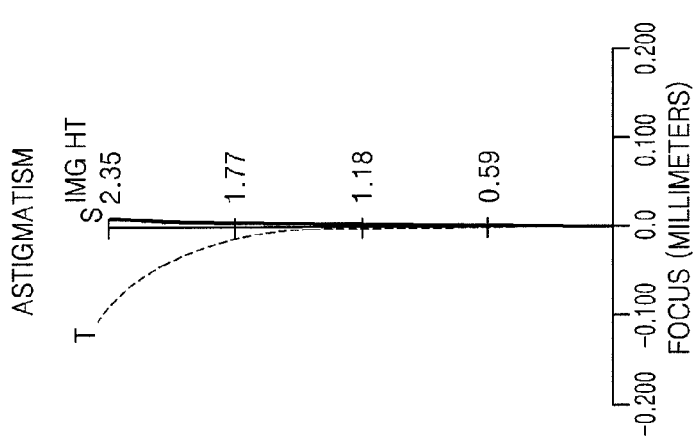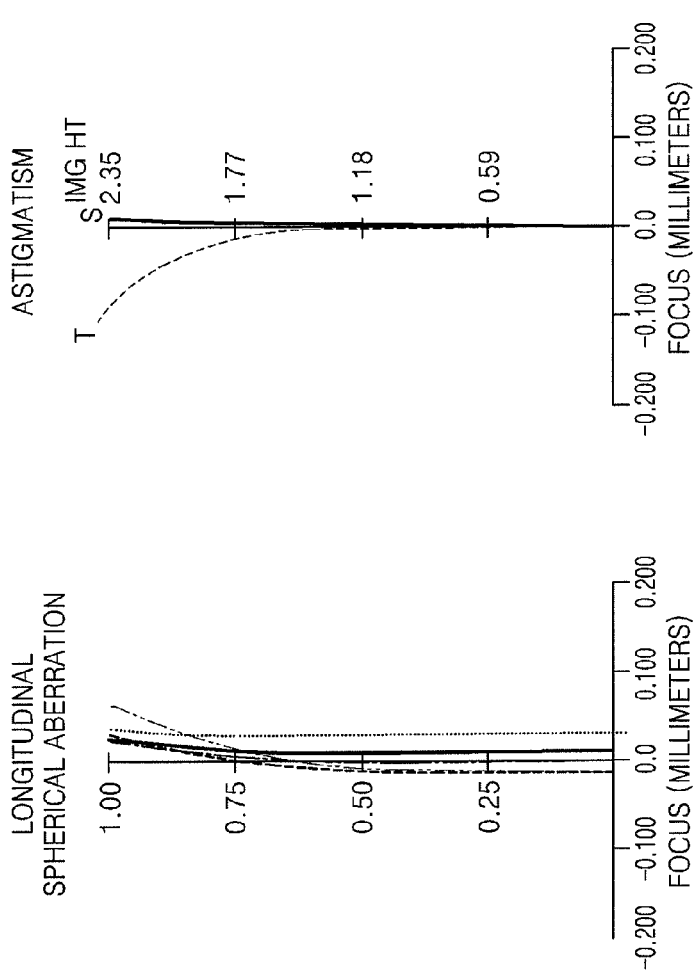

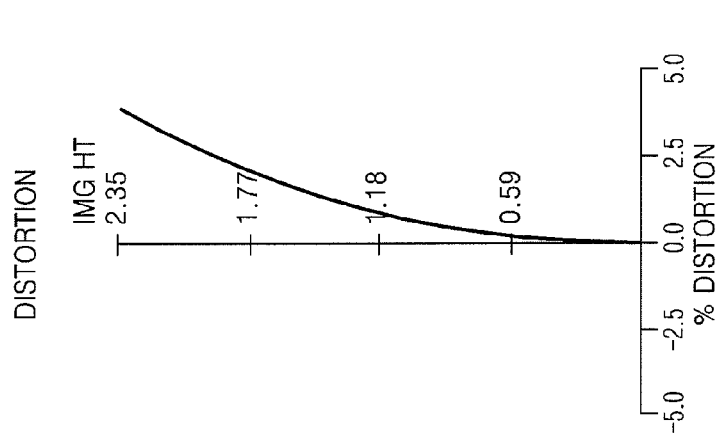
FIG. 10C
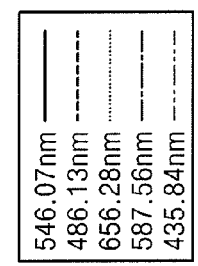
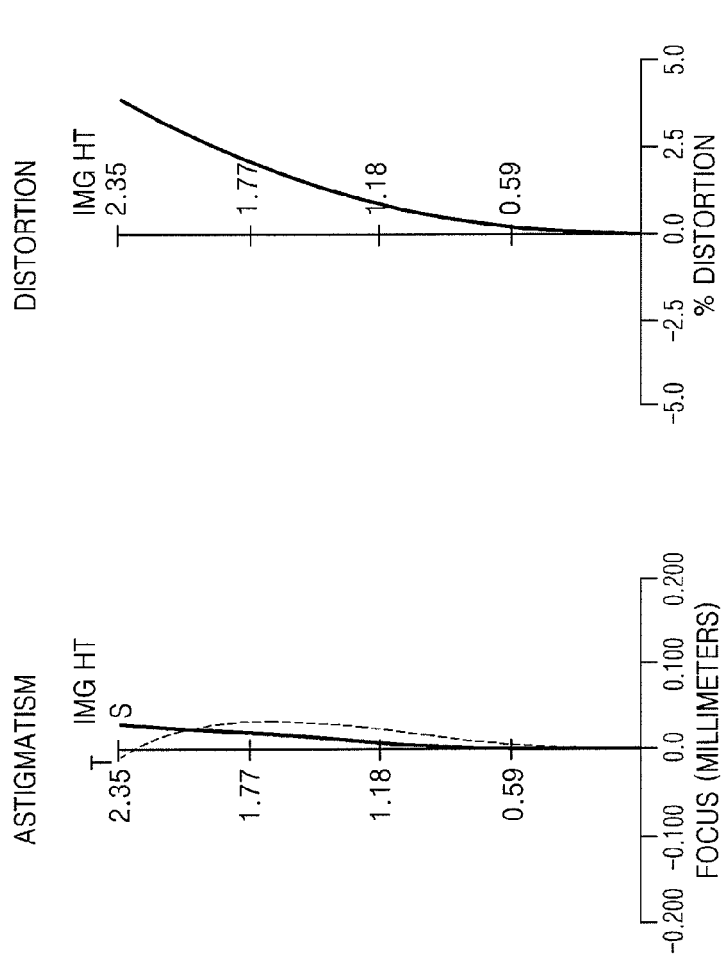
FIG. 10B
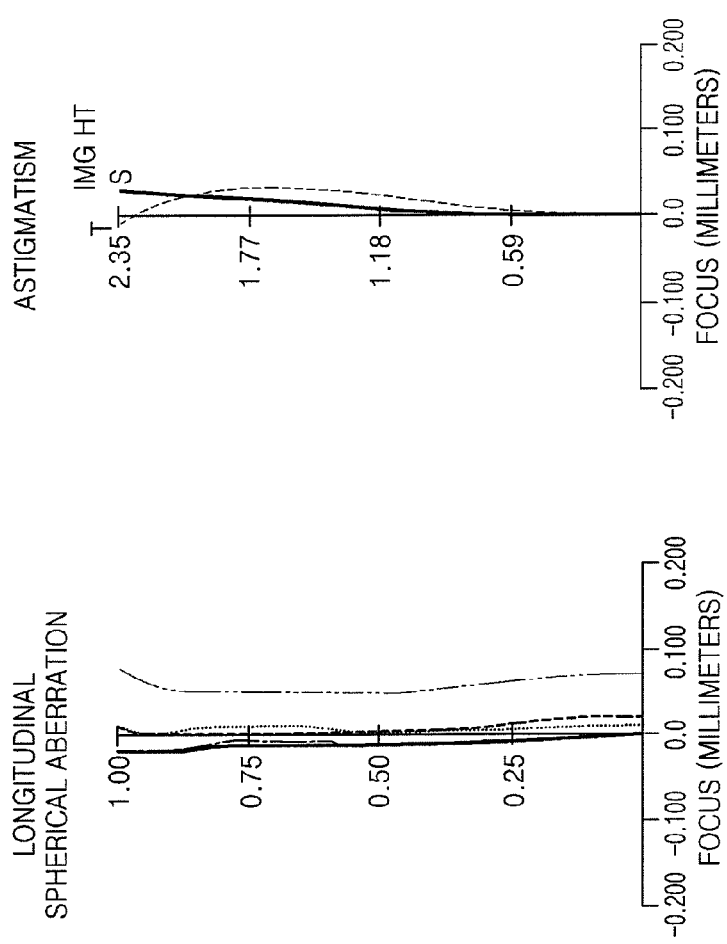
FIG. 10A

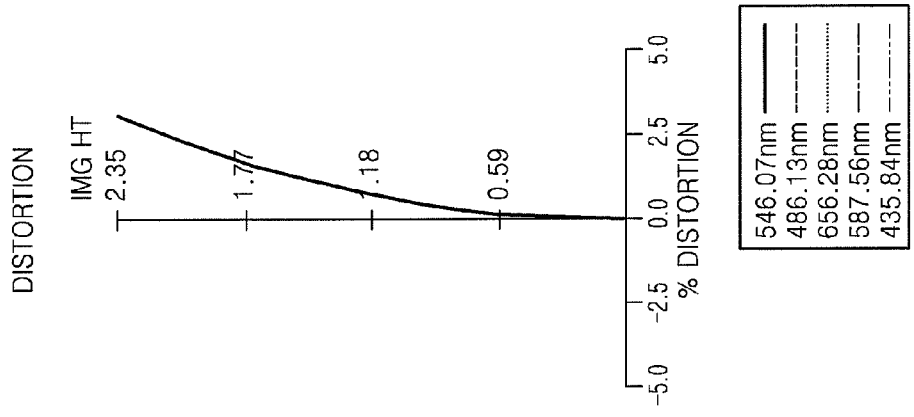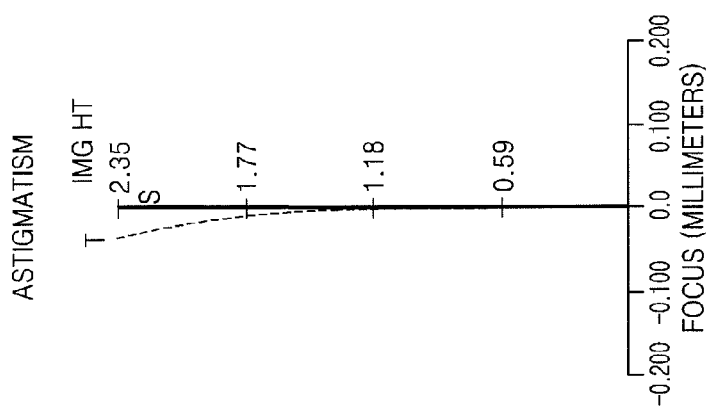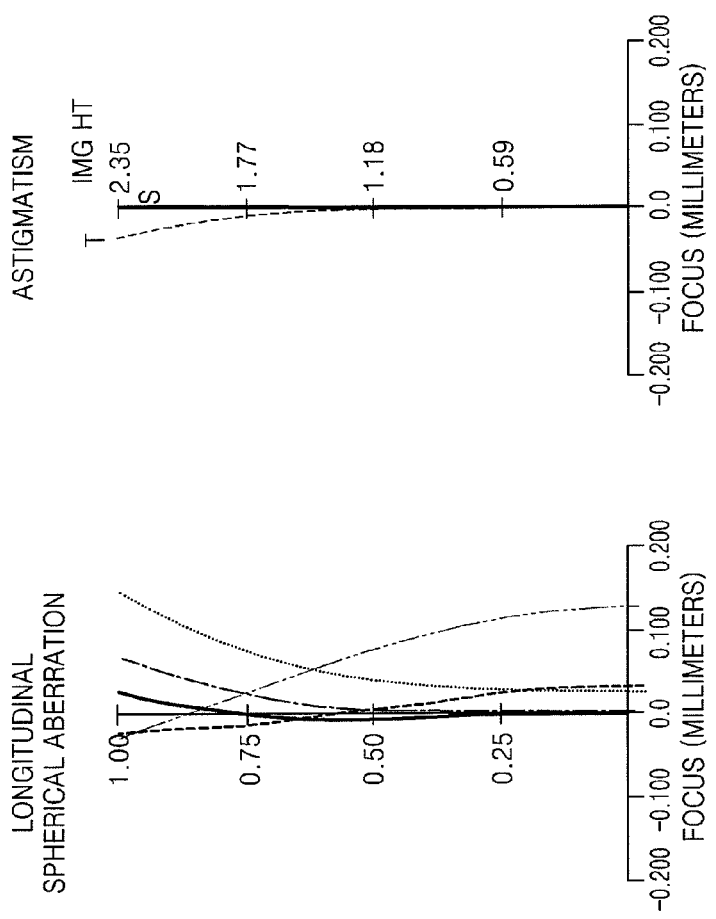

| 546.07nm ——— |
| 486.13nm - - - - |
| 656.28nm ······· |
| 587.56nm —·—·— |
| 435.84nm —··—··— |
FIG. 12A
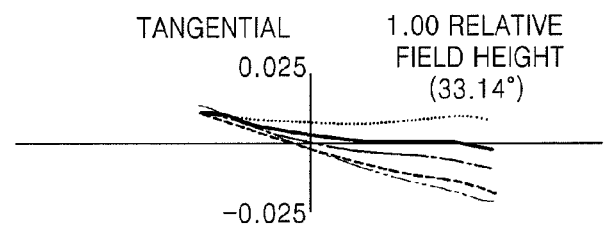 
TANGENTIAL  1.00 RELATIVE FIELD HEIGHT (33.14°)
FIG. 12B
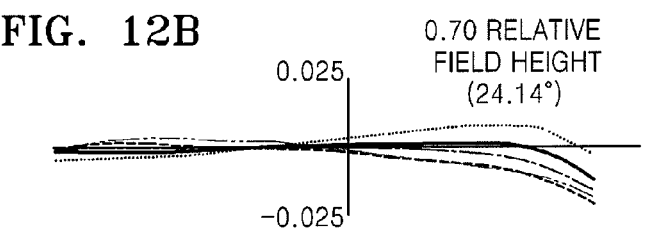 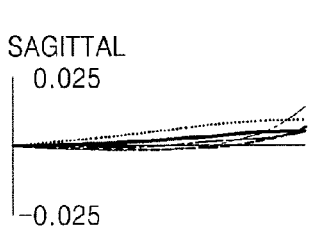
0.70 RELATIVE FIELD HEIGHT (24.14°)  SAGITTAL
FIG. 12C
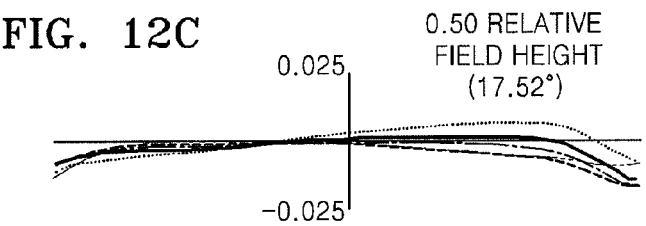 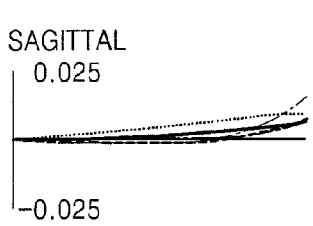
0.50 RELATIVE FIELD HEIGHT (17.52°)  SAGITTAL
FIG. 12D
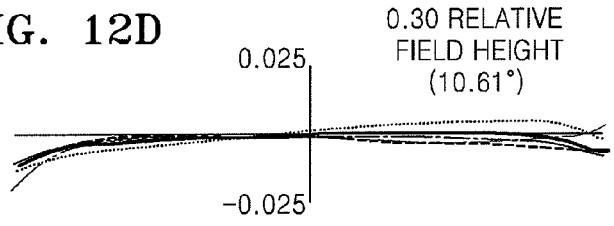 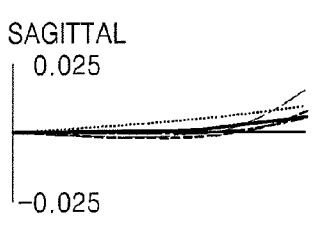
0.30 RELATIVE FIELD HEIGHT (10.61°)  SAGITTAL
FIG. 12E
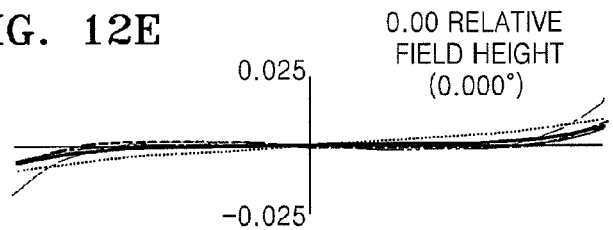 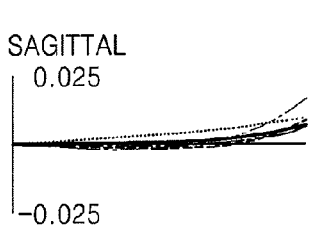
0.00 RELATIVE FIELD HEIGHT (0.000°)  SAGITTAL

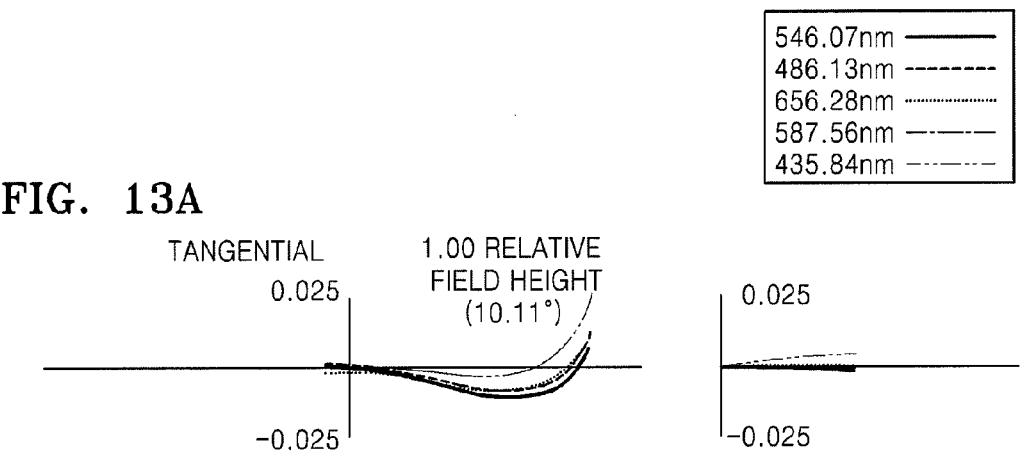
FIG. 13A
FIG. 13B
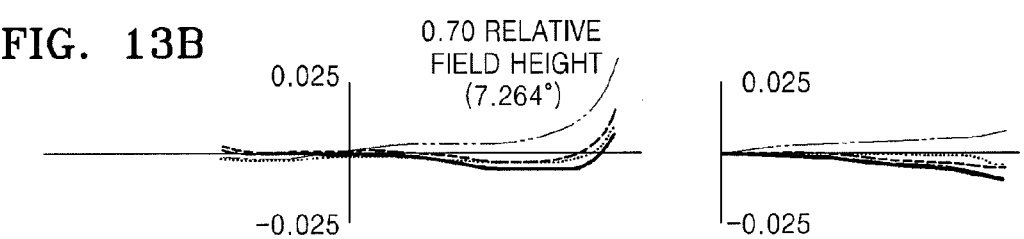
FIG. 13C
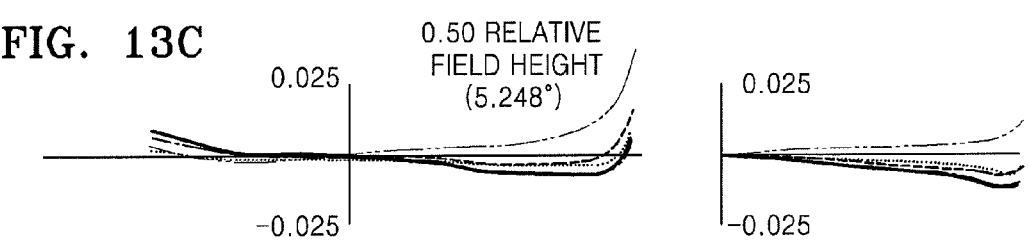
FIG. 13D
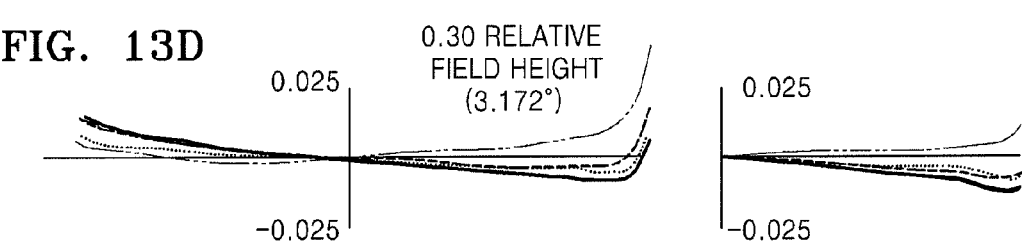
FIG. 13E
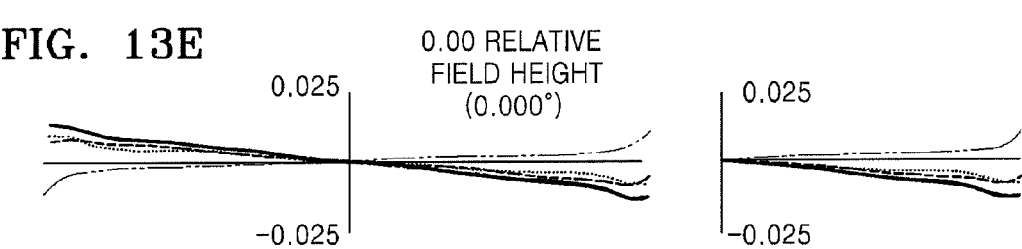

ZOOM LENS SYSTEM

CROSS-REFERENCE TO RELATED PATENT APPLICATION

This application claims priority from Korean Patent Application No. 10-2011-0012464, filed on Feb. 11, 2011, in the Korean Intellectual Property Office, the disclosure of which is incorporated herein in its entirety by reference.

BACKGROUND

1. Field

Apparatuses consistent with exemplary embodiments relate to a zoom lens system, and more particularly, to a four (4)-group zoom lens system.

2. Description of the Related Art

Storage capacity of photographing apparatuses that captures an image by using a charge-coupled device (CCD) or a complementary metal-oxide semiconductor (CMOS) increases as the photographing apparatuses become more and more digital. As the storage capacity increases, a lens system employed in the digital photographing apparatus is required to have relatively high optical performance and a relatively small size.

In order to clearly record small information of a subject, the lens system may satisfactorily compensate for even aberration generated around an image plane. However, it is difficult to miniaturize the lens system if relatively high performance is to be realized, and manufacturing costs increase to miniaturize the lens system. Thus, it is difficult to simultaneously satisfy relatively high optical performance and relatively low manufacturing costs.

SUMMARY

One or more exemplary embodiments provide a zoom lens system having a relatively small size, a relatively long back focal length, and relatively high optical performance.

According to an aspect of an exemplary embodiment, there is provided a zoom lens system including, in an order from an object to an image: a first lens group including at least one lens, and a refraction member for bending an optical axis, and having positive refractive power; a second lens group having negative refractive power; a third lens group; and a fourth lens group, wherein zooming is performed by changing at least one interval between the first through fourth lens groups, and the zoom lens system satisfies expressions below:

$$Fno\_w \leq 2.0$$

$$5.5 \leq f_T/f_W$$

$$7.5\% \leq BFL/OAL,$$

wherein Fno_w denotes an F-number at a wide-mode, $f_T$ denotes an overall focal length at a tele-mode, $f_W$ denotes an overall focal length at the wide-mode, BFL denotes a back focal length of the zoom lens system, and OAL denotes an overall length of the zoom lens system from a center of a lens surface of a lens closest to the object to an image plane of the image.

The zoom lens system may satisfy an expression below:

$$13.7\% \leq BFL/OAL.$$

The zoom lens system may satisfy an expression below:

$$BFL \geq 6 \text{ mm},$$

wherein BFL denotes the back focal length at the wide-mode.

The zoom lens system may satisfy an expression below:

$$BFL \geq 8 \text{ mm},$$

wherein BFL denotes the back focal length at the wide-mode.

The zoom lens system may satisfy an expression below:

$$OAL \leq 65 \text{ mm}.$$

The zoom lens system may satisfy an expression below:

$$1.7 \leq Fno\_w \leq 2.0.$$

The zoom lens system may satisfy an expression below:

$$5.5 \leq f_T/f_W \leq 7.5.$$

When the zooming is performed from the wide-mode to the tele-mode, the second and fourth lens groups may move and the first and third lens groups may be fixed.

The third lens group may have positive refractive power.

The fourth lens group may have positive refractive power.

The first lens group may include at least one aspheric surface.

The fourth lens group may include a positive lens and a negative lens in an order from the object to the image.

A lens of the fourth lens group closest to the object may have at least one aspheric surface.

The positive lens of the fourth lens group may satisfy an expression below:

$$Nd < 1.5,$$

wherein Nd denotes a refractive index of the positive lens of the fourth lens group.

The third lens groups may include a cemented lens formed of a positive lens and a negative lens.

The zoom lens system may further include an aperture disposed between the second lens group and the third lens group.

The second lens group comprises a plurality of lenses including a first lens closest to the object and a second lens second closest to the object which satisfy an expression below:

$$1.35 < f9/f11 < 1.75$$

wherein f9 denotes a focal length of the first lens of the second lens group, and f11 denotes a focal length of the second lens of the second lens group.

The second lens of the second lens group is a cemented lens formed of a negative lens and a positive lens.

According to another aspect of the present invention, there is provided a zoom lens system including, in an order from an object to an image: a first lens group including at least one lens, and a refraction member for bending an optical axis, and having positive refractive power; a second lens group having negative refractive power; a third lens group; and a fourth lens group, wherein zooming is performed by changing at least one interval between the first through fourth lens groups, and a total number of lenses forming the first through fourth lens groups is less than or equal to 10.

The third and fourth lens groups have positive refractive power.

BRIEF DESCRIPTION OF THE DRAWINGS

The above and other aspects will become more apparent by describing in detail exemplary embodiments thereof with reference to the attached drawings, in which:

FIGS. 1A-1C illustrate diagrams respectively illustrating a wide-mode, a middle-mode, and a tele-mode of a zoom lens system, according to an exemplary embodiment;

FIGS. 2A-2C illustrate longitudinal spherical aberration, astigmatism, and distortion aberration at the wide-mode of the zoom lens system of FIGS. 1A-1C, according to an exemplary embodiment;

FIGS. 3A-3C illustrate longitudinal spherical aberration, astigmatism, and distortion aberration at the middle-mode of the zoom lens system of FIGS. 1A-1C, according to an exemplary embodiment;

FIGS. 8A-8C illustrate diagrams respectively illustrating a wide-mode, a middle-mode, and a tele-mode of a zoom lens system, according to an exemplary embodiment;

FIGS. 9A-9C illustrate longitudinal spherical aberration, astigmatism, and distortion aberration at the wide-mode of the zoom lens system of FIGS. 8A-8C, according to an exemplary embodiment;

FIGS. 10A-10C illustrate longitudinal spherical aberration, astigmatism, and distortion aberration at the middle-mode of the zoom lens system of FIGS. 8A-8C, according to an exemplary embodiment;

FIGS. 11A-11C illustrate longitudinal spherical aberration, astigmatism, and distortion aberration at the tele-mode of the zoom lens system of FIGS. 8A-8C, according to an exemplary embodiment;

FIGS. 12A-12E illustrate comma aberration at the wide-mode of the zoom lens system of FIGS. 8A-8C, according to an exemplary embodiment;

FIG. 13A-13E illustrate comma aberration at the middle-mode of the zoom lens system of FIGS. 8A-8C, according to an exemplary embodiment.

DETAILED DESCRIPTION OF EXEMPLARY EMBODIMENTS

Figure 4C:
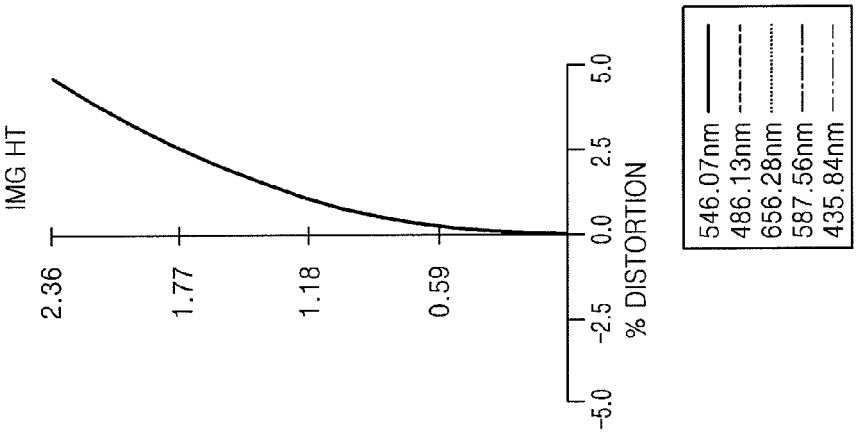
FIGS. 4A-4C illustrate longitudinal spherical aberration, astigmatism, and distortion aberration at the tele-mode of the zoom lens system of FIGS. 1A-1C, according to an exemplary embodiment.

Hereinafter, exemplary embodiments will be described more fully with reference to the accompanying drawings. The inventive concept may, however, be embodied in many different forms and should not be construed as being limited to the exemplary embodiments set forth herein; rather, these exemplary embodiments are provided so that this disclosure will be thorough and complete, and will fully convey the inventive concept to those skilled in the art. Unless defined otherwise, technical and scientific terms used herein have the same meaning as is commonly understood by one of ordinary skill in the art to which this inventive concept belongs. An expression used in the singular encompasses the expression of the plural, unless it has a clearly different meaning in the context. Also, it is to be understood that the terms such as "comprise" and/or "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added. Terms such as first, second, etc. may be used to describe various elements, but these terms do not limit elements and may be used to classify one element from another.

FIGS. 1A-1C and FIGS. 8A-8C are each diagrams respectively illustrating a wide-mode, a middle-mode, and a tele-mode of a zoom lens system, according to exemplary embodiments.

Referring to FIGS. 1A-1C and FIGS. 8A-8C, the zoom lens system includes a first lens group G1, a second lens group G2, a third lens group G3, and a fourth lens group G4 in an order from an object O to an image I.

The first lens group G1 has positive refractive power. For example, the first lens group G1 may include a first lens 11 or 111, refraction members 12 and 13 or 112 and 113 for bending a path of a beam penetrated through the first lens 11 or 111, and a second lens 14 or 114. The first lens 11 or 111 may be a negative lens, and the second lens 14 or 114 may be a positive lens. The refraction members 12 and 13 or 112 and 113 may bend the beam penetrated through the first lens 11 or 111 up to about 90°. For example, a reflection mirror, a prism, or an optical fiber may be used as the refraction members 12 and 12 or 112 and 113. The refraction members 12 and 13 or 112 and 113 refract incident light up to about 90° with respect to an optical axis, thereby miniaturizing a photographing apparatus including the zoom lens system according to the exemplary embodiments.

The first lens 11 or 111 may be, for example, a meniscus lens having a convex surface facing the object O. The second lens 14 or 114 may be a biconvex lens.

The first lens group G1 may include at least one aspheric surface. Accordingly, spherical aberration generated at the tele-mode may be compensated for.

The second lens group G2 has negative refractive power. For example, the second lens group G2 may include three lenses, i.e., a third lens 21 or 121, a fourth lens 22 or 122, and a fifth lens 23 or 123. The third lens 21 or 121 and the fourth lens 22 or 122 may be negative lenses, and the fifth lens 23 or 123 may be a positive lens. The fourth lens 22 or 122, and the fifth lens 23 or 123 may be combined to each other to form a cemented lens. The cemented lens may compensate for lateral chromatic aberration that may be generated during zooming.

The third lens group G3 has positive refractive power. For example, the third lens group G3 may include a sixth lens 31 or 131, a seventh lens 32 or 132, and an eighth lens 33 or 133. The sixth lens 31 or 131, and the seventh lens 32 or 132 may be positive lenses, and the eighth lens 33 or 133 may be a negative lens. The seventh lens 32 or 132, and the eighth lens 33 or 133 may be combined to each other to form a cemented lens. The cemented lens may compensate for lateral chromatic aberration that may be generated during zooming. An aperture ST may be disposed between the second and third lens groups G2 and G3.

The fourth lens group G4 has positive refractive power. For example, the fourth lens group G4 may include two lenses, i.e., a ninth lens 41 or 141 and a tenth lens 42 or 142. The ninth lens 41 or 141 may be a positive lens, and the tenth lens 42 or 142 may be a negative lens.

The fourth lens group G4 may include at least one aspheric surface. For example, the ninth lens 41 or 141 of the fourth lens group G4, which is closest to the object O, may include at least one aspheric surface. By including the aspheric surface, astigmatism that may be generated during zooming may be effectively compensated for. For example, each of surfaces of the ninth lens 41 or 141 in the fourth lens group G4 may be aspheric so as to more effectively compensate for astigmatism.

In the zoom lens system according to the exemplary embodiments, the second and fourth lens groups G2 and G4 may move during zooming. And, the first and third lens groups G1 and G3 may be fixed during zooming. Accordingly, an overall length of the zoom lens system does not change during zooming.

The second lens group G2 is responsible for magnification during zooming. For example, during zooming from the wide-mode to the tele-mode, the second lens group G2 performs magnification by moving from the object O to the image I. When zooming from the wide-mode to the tele-mode, an interval between the second and third lens groups G2 and G3 decreases, and an interval between the first and second lens groups G1 and G2 increases.

During zooming, the fourth lens group G4 performs a focusing function for adjusting a focus. For example, during zooming from the wide-mode to the tele-mode, the fourth lens group G4 may trace a parabolic path by first moving to the object O and then to the image I. The fourth lens group G4 when performing the focusing function during zooming traces a path that has an overall parabolic shape, but a moving amount thereof may vary. For example, after zooming from the wide-mode to the tele-mode, the fourth lens group G4 may be closer to the object O in FIGS. 8A-8C than in FIGS. 1A-1C. For reference, although it is not clearly shown in FIGS. 8A-8C, the path that the fourth lens group G4 traces is actually parabolic during zooming from the wide-mode to the tele-mode.

A space for the aperture ST may be obtained by moving only two lens groups during zooming. For example, when the zoom lens system is used in a photographing apparatus, such as a closed-circuit television (CCTV), a sufficient space may be secured between the second and third lens groups G2 and G3 for a thick aperture unit to be disposed in the space.

The zoom lens system according to the exemplary embodiments may satisfy the following expression.

$$Fno\_w \leq 2.0 \quad (1)$$

Here, Fno_w denotes an F-number at the wide-mode. The zoom lens systems according to the exemplary embodiments may be relatively bright when the F-number at the wide-mode is less than or equal to 2.0. For example, the F-number at the wide-mode may be in the range from 1.7 to 2.0.

$$5.5 \leq f_T/f_W \quad (2)$$

Here, $f_W$ denotes an overall focal length at the wide-mode, and $f_T$ denotes an overall focal length at the tele-mode. The zoom lens systems according to the exemplary embodiments may provide relatively high magnification equal to or greater than about 5.5 times. For example, the zoom lens systems may have magnification in the range from about 5.5 to about 7.5 times.

$$7.5\% \leq BFL/OAL \quad (3)$$

Here, the BFL denotes a back focal length, and the OAL denotes an overall length of the zoom lens system from a center of the lens surface on the object side to an image plane (i.e., a distance from a center of an object surface of the first lens 11 or 111 to an image plane). BFL denotes the distance from the last surface of the zoom lens system to the second focal point of the zoom lens system, and the second focal point of the zoom lens system denotes image plane.

The above expression (3) defines a back focal length with respect to an overall length of the zoom lens system, and the zoom lens systems according to the exemplary embodiments may have a relatively long back focal length. The back focal length may be equal to or greater than about 7.5% of the overall length of the zoom lens system, for example, equal to or greater than 13.7% of the overall length of the zoom lens system. A photographing apparatus, such as a CCTV, not only captures an image during the day, but also at night. In order to obtain a high quality image, the CCTV may include filters suitable for day and night photographing. Since a ratio of the BFL to the overall length is relatively large, a day filter and a night filter may be easily exchanged. For example, the BFL may be equal to or greater than 6 mm, for example, equal to or greater than 8 mm at wide-mode, as represented by the following expressions.

$$BFL \geq 6 \text{ mm} \quad (4)$$

$$BFL \geq 8 \text{ mm} \quad (5)$$

Also, the overall length of the zoom lens system may satisfy the following expression.

$$OAL \leq 65 \text{ mm} \quad (6)$$

Again, the OAL denotes an overall length of the zoom lens system from a center of the lens surface on the object side to an image plane. Referring to the above expression (6), a photographing apparatus may be miniaturized since the overall length of the zoom lens system is less than or equal to about 65 mm.

The positive lens included in the fourth lens group G4 may satisfy the following expression.

$$Nd < 1.5 \quad (7)$$

Here, Nd denotes a refractive index with respect to a d-line of the positive lens included in the fourth lens group G4. The fourth lens group G4 may include a lens having relatively low refractive power, thereby securing a relatively long BFL.

The second lens group G2 may satisfy the following expression.

$$1.35 < f9/f11 < 1.75 \quad (8)$$

Here, f9 denotes a focal length of a lens in the second lens group G2 closest to the object O, and f11 denotes a focal length of a lens in the second lens group G2 second closest to the object O. For example, f9 denotes a focal length of the third lens 21 or 121, and f11 denotes a focal length of the cemented lens formed of the fourth lens 22 or 122 and the fifth lens 23 or 123 combined to each other.

The aspheric surfaces described above may be defined as follows.

When an optical axis direction is an x-axis, and a direction perpendicular to the optical axis direction is a y-axis, an aspheric shape of a zoom lens according to an exemplary embodiment may be represented by Equation (9) below, wherein a proceeding direction of the beam is positive. In Equation (9), x denotes a distance from a peak of the zoom lens in the optical axis direction, y denotes a distance from the y-axis in the direction perpendicular to the optical axis direction, k denotes a conic constant, A, B, C, and D each denote an aspheric coefficient, and c denotes an inverse number (1/R) of a radius of curvature at the peak of the zoom lens.

$$x = \frac{cy^2}{1 + \sqrt{1 - (k+1)c^2 y^2}} + Ay^4 + By^6 + Cy^8 + Dy^{10} \quad (9)$$

Design data of a zoom lens system according to an exemplary embodiment will now be described.

Hereinafter, F denotes a focal length, Fno denotes an F-number, D8, D13, D19, and D23 each denote a variable distance. Also, R denotes a radius of curvature, Dn denotes a thickness at a center of a lens or an interval between lenses, nd denotes a refractive index of a material, vd denotes an Abbe number of the material, and ASP denotes an aspheric surface.

Table 1 below shows design data of the zoom lens system shown in FIGS. 1A-1C. In Table 1, optical devices, such as filters 50 and 60 may be further disposed between the tenth lens 42 and the image I. In Table 1, Rn (n=1 through 27) denotes a radius of curvature of a surface Sm (m=1 through 27) of each lens shown in FIGS. 1A-1C.

F=3.8-25.2995
Fno=1.81-3.47
BFL=8.787
OAL=63.899

TABLE 1

| N | Rn | Dn | nd | vd |
|---|---|---|---|---|
| 1 | 41.22000 | 0.800000 | 1.922860 | 20.8804 |
| 2 | 12.99500 | 2.380018 | | |
| 3 | INFINITY | 6.570000 | | |
| 4 | INFINITY | 6.570000 | 1.846663 | 23.7848 |
| S | INFINITY | 0.200000 | 1.846663 | 23.7848 |
| S | INFINITY | 2.582865 | | |
| 7 | 19.73882 | 0.500000 | 1.689970 | 53.0000 |
| S | −20.98112 | 0.649772 | | |
| 9 | 26.96602 | 1.947832 | 1.620913 | 60.2980 |
| 10 | 7.87672 | 0.600000 | | |
| 11 | −9.25940 | 1.501065 | 1.713000 | 53.9389 |
| 12 | 10.13062 | 17.436322 | 1.922860 | 20.8804 |
| 13 | 47.31444 | 0.200000 | | |
| 14 (ST) | INFINITY | 1.786658 | | |
| 15 | 11.87198 | 0.206710 | 1.784719 | 25.7208 |
| 16 | INFINITY | 2.700936 | | |
| 17 | 9.19313 | 0.600000 | 1.487489 | 70.4412 |
| 18 | −15.59835 | 3.871955 | 1.846663 | 23.7848 |
| 19 | 11.74960 | 3.124271 | | |
| 20 | 5.42509 | 0.200000 | 1.484630 | 69.8000 |
| 21 | −10.00017 | 0.684290 | | |
| 22 | 7.35526 | 0.987305 | 1.761818 | 26.6090 |
| 23 | 3.98879 | 2.120000 | | |
| 24 | INFINITY | 0.300000 | 1.516798 | 64.1983 |
| 25 | INFINITY | 0.500000 | | |
| 26 | INFINITY | 4.87779 | 1.516798 | 64.1983 |
| 27 | INFINITY | 0.001836 | | |
| IMAGE | INFINITY | | | |

Table 2 shows aspheric coefficients in the zoom lens system of FIGS. 1A-1C, and Table 3 shows variable distances at the wide-mode, the middle-mode, and the tele-mode.

TABLE 2

| | K | A | B | C | D |
|---|---|---|---|---|---|
| S7 | −1.434688 | −.239576E−04 | −.266641E−07 | −.104284E−09 | 0.000000E+00 |
| S20 | −0.535579 | −.459864E−03 | −.396917E−05 | −.501588E−06 | 0.000000E+00 |
| S21 | −3.324261 | 0.732451E−03 | −.376636E−04 | 0.491937E−06 | 0.000000E+00 |

TABLE 3

| | D8 | D12 | D18 | D22 |
|---|---|---|---|---|
| Wide-mode | 0.5 | 17.43632 | 3.871955 | 0.987305 |
| | 6.464339 | 11.47198 | 2.134442 | 2.724819 |
| Middle-mode | 10.60992 | 7.326405 | 0.721278 | 4.137982 |
| | 14.22148 | 3.71484 | 0.638991 | 4.22027 |
| Tele-mode | 16.03632 | 1.9 | 2.092012 | 2.767248 |

Figure 4B:
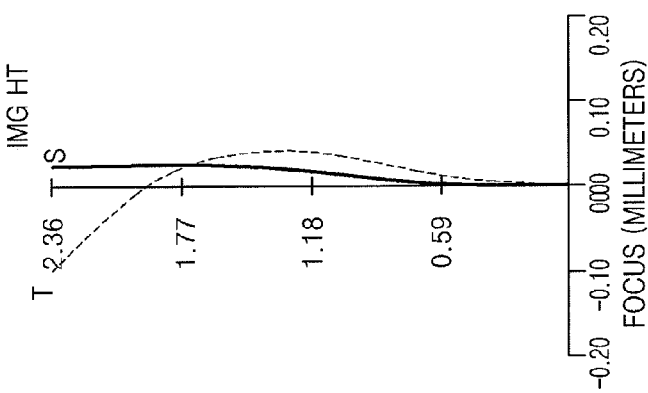
Figure 4A:
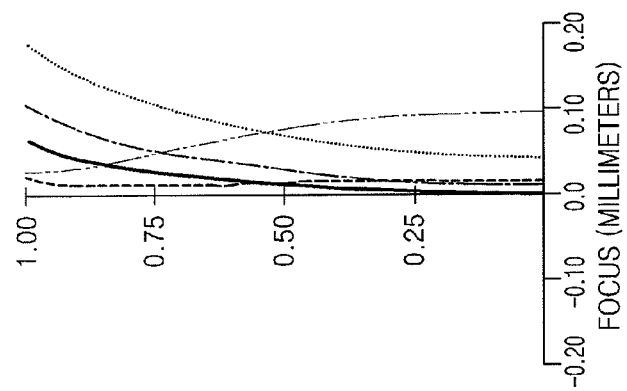

FIGS. 2A through 4C illustrate longitudinal spherical aberration, astigmatism, and distortion aberration, respectively, at the wide-mode, the middle-mode, and the tele-mode of the zoom lens system of FIGS. 1A-1C. Referring to FIG. 2B about a curvature of image field, in an astigmatic field curve, a dotted line denotes tangential astigmatism, and a solid line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion aberration are shown with respect to light having a wavelength of about 546.07 nm.

Figure 5A:
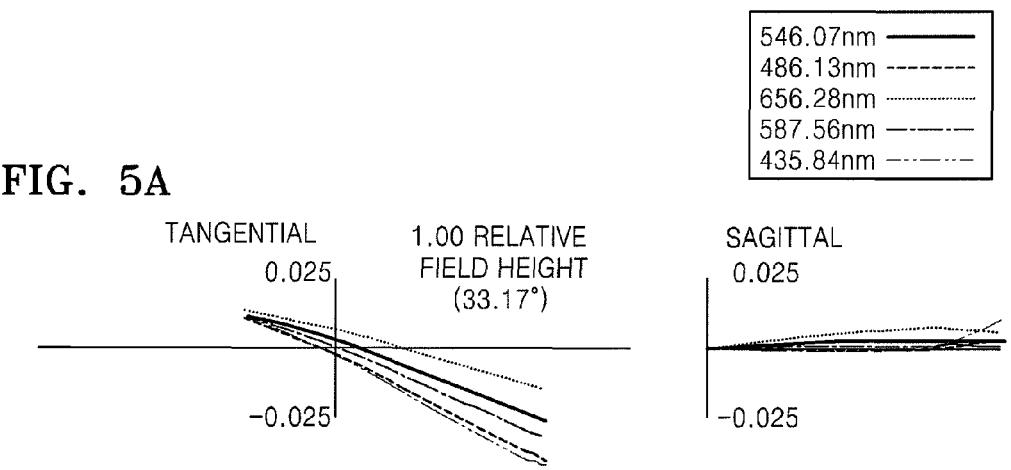
FIGS. 5A-5E illustrate comma aberration at the wide-mode of the zoom lens system of FIGS. 1A-1C, according to an exemplary embodiment.
Figure 5B:
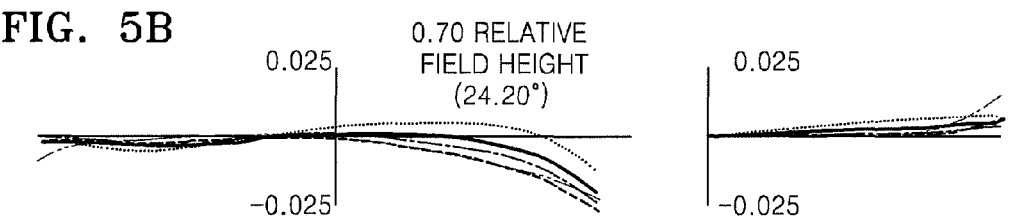
Figure 5C:
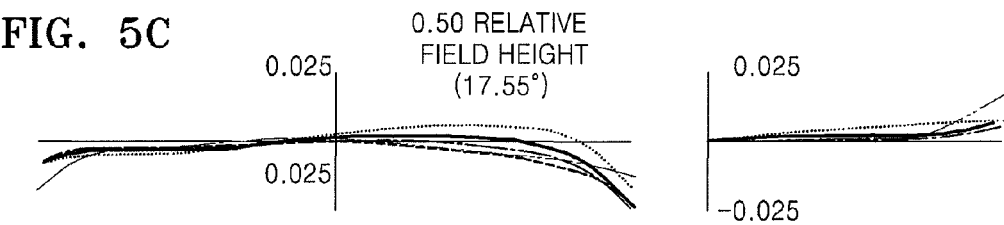
Figure 5D:
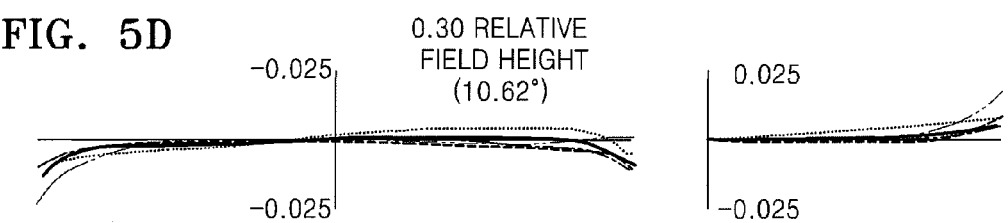
Figure 5E:
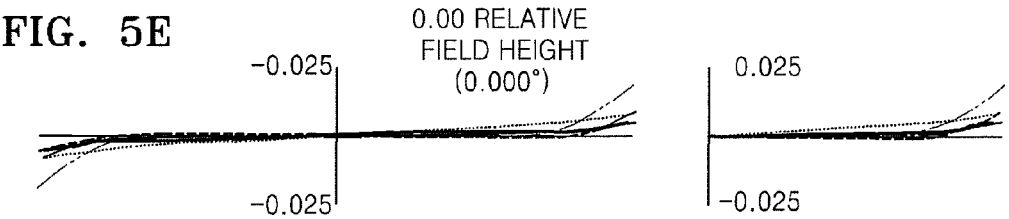
Figure 6A:
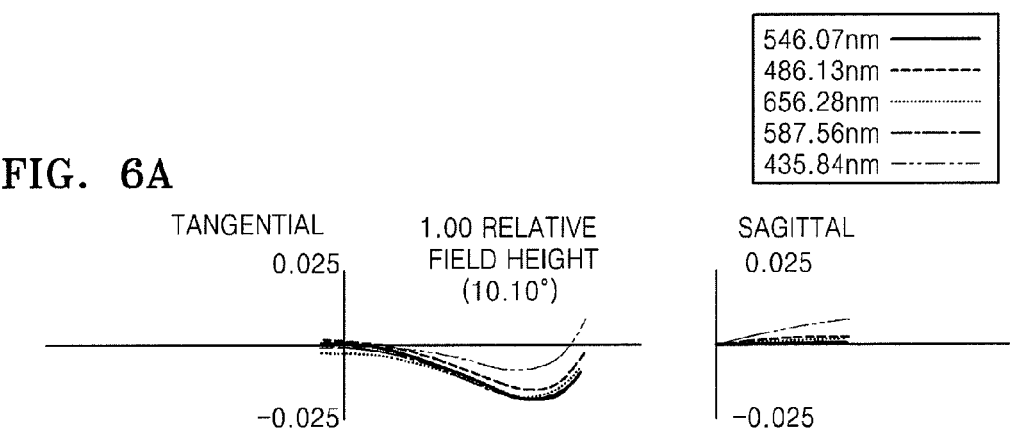
FIGS. 6A-6E illustrate comma aberration at the middle-mode of the zoom lens system of FIGS. 1A-1C, according to an exemplary embodiment.
Figure 6B:
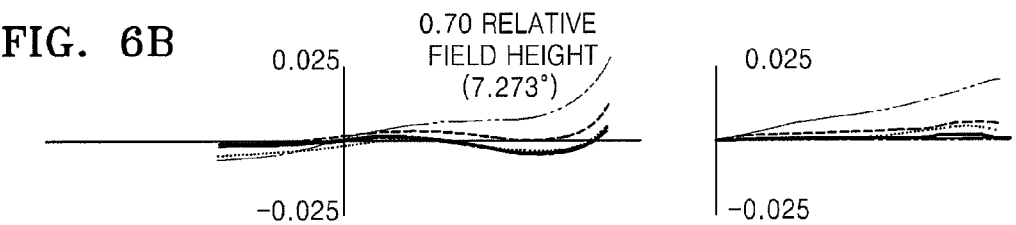
Figure 6C:
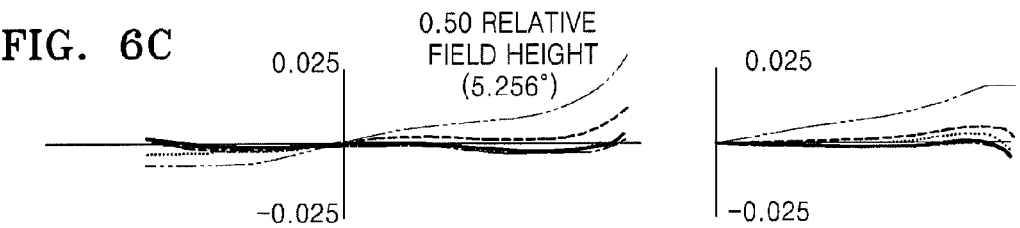
Figure 6D:
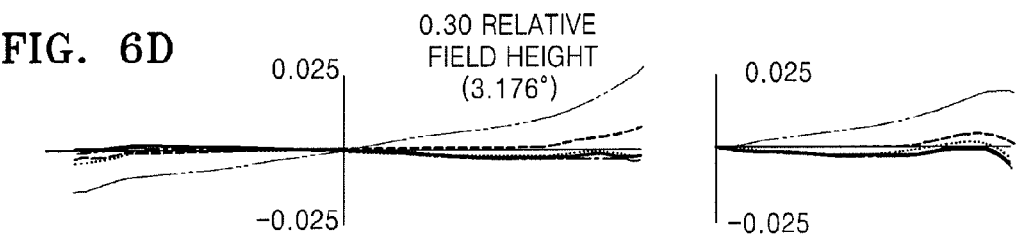
Figure 6E:
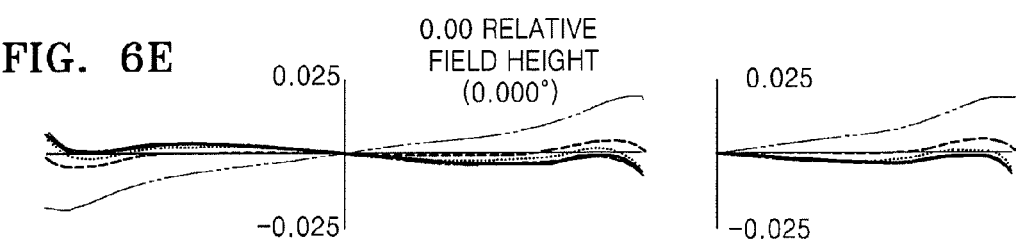
Figure 7A:
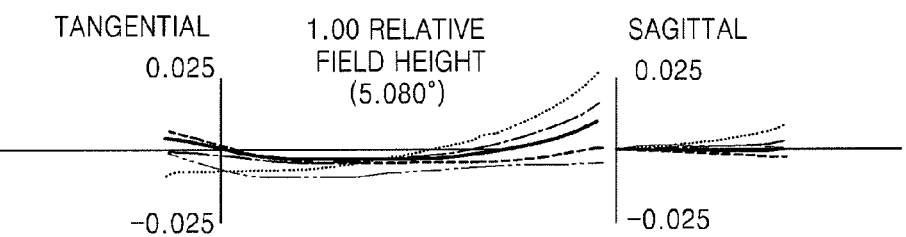
FIGS. 7A-7E illustrate comma aberration at the tele-mode of the zoom lens system of FIGS. 1A-1C, according to an exemplary embodiment.
Figure 7B:
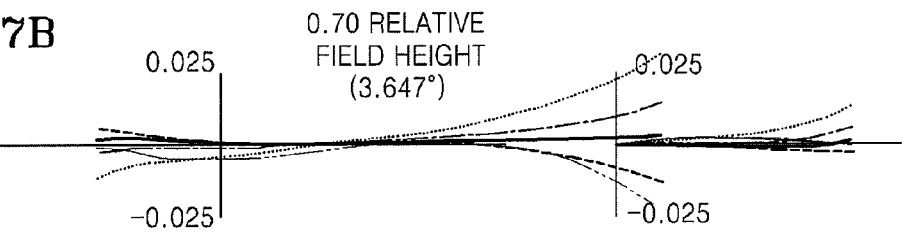
Figure 7C:
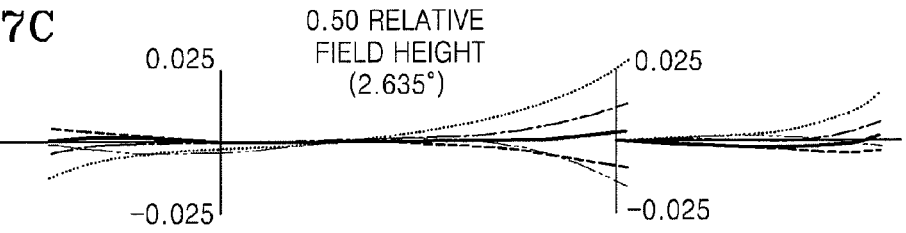
Figure 7D:
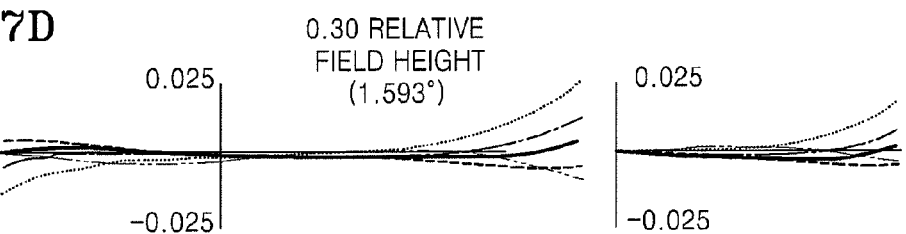
Figure 7E:
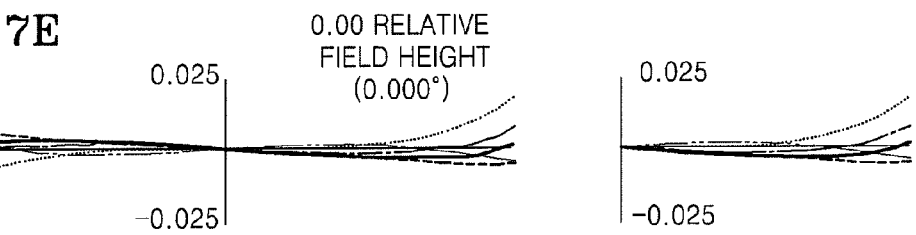

FIGS. 5A through 7E illustrate comma aberration at the wide-mode, the middle-mode, and the tele-mode of the zoom lens system of FIGS. 1A-1C. In FIGS. 5A through 5E, 6A through 6E, and 7A through 7E, left graphs show tangential comma aberration, and right graphs show sagittal comma aberration. Meanwhile, the comma aberration is comma aberration when incident angles of light incident on the zoom lens system of FIGS. 1A-1C are 33.17°, 24.20°, 17.55°, 10.62°, and 0°.

Table 4 below shows design data of the zoom lens system shown in FIGS. 8A-8C. In Table 4, optical devices, such as filters 150 and 160 may be further disposed between the tenth lens 142 and the image I. In Table 4, Rn (n=1 through 27) denotes a radius of curvature of a surface Sm (m=1 through 27) of each lens shown in FIGS. 8A-8C.

F=3.803-25.2914
Fno=1.81-3.47
BFL=8.826
OAL=63.799

TABLE 4

| N | Rn | Dn | nd | vd |
|---|---|---|---|---|
| 1 | 41.21981 | 0.800000 | 1.922860 | 20.8804 |
| 2 | 12.99516 | 2.374202 | | |
| 3 | INFINITY | 6.570000 | | |
| 4 | INFINITY | 6.570000 | 1.846663 | 23.7848 |
| 5 | INFINITY | 0.200000 | 1.846663 | 23.7848 |
| 6 | INFINITY | 2.431396 | | |
| 7 | 20.64673 | 0.500000 | 1.689970 | 53.0000 |
| 8 | −21.04550 | 0.600000 | | |
| 9 | 14.81005 | 1.701928 | 1.613091 | 60.5909 |
| 0 | 6.71320 | 0.600000 | | |
| 11 | −9.15279 | 1.591833 | 1.713000 | 53.9389 |
| 12 | 8.32757 | 16.501704 | 1.922860 | 20.8804 |
| 13 | 31.52072 | 0.200000 | | |
| 14 | INFINITY | 1.754946 | | |

TABLE 4-continued

| N | Rn | Dn | nd | vd |
|---|---|---|---|---|
| (ST) 15 | 12.22034 | 0.200000 | 1.784719 | 25.7208 |
| 16 | INFINITY | 2.677185 | | |
| 17 | 8.76360 | 0.600000 | 1.487489 | 70.4412 |
| 18 | −16.67494 | 4.880743 | 1.846663 | 23.7848 |
| 19 | 10.61261 | 3.206931 | | |
| 20 | 5.48253 | 0.200000 | 1.484630 | 69.8000 |

TABLE 4-continued

| N | Rn | Dn | nd | vd |
|---|---|---|---|---|
| 21 | −11.28209 | 0.811811 | | |
| 22 | 6.18382 | 1.027321 | 1.761818 | 26.6090 |
| 23 | 3.84814 | 2.120000 | | |
| 24 | INFINITY | 0.300000 | 1.516798 | 64.1983 |
| 25 | INFINITY | 0.500000 | | |
| 26 | INFINITY | 4.874915 | 1.516798 | 64.1983 |
| 27 | INFINITY | 0.003662 | | |
| IMAGE | INFINITY | | | |

Table 5 shows aspheric coefficients in the zoom lens system of FIGS. 8A-8C, and Table 6 shows variable distances at the wide-mode, the middle-mode, and the tele-mode.

TABLE 5

| | K | A | B | C | D |
|---|---|---|---|---|---|
| S107 | −1.299296 | −.223377E−04 | −.562440E−07 | 0.285225E−09 | 0.000000E+00 |
| S120 | −0.650866 | −.316908E−03 | −.435761E−05 | 0.815473E−08 | 0.000000E+00 |
| S121 | −1.364424 | 0.674901E−03 | −.219568E−04 | 0.377814E−06 | 0.000000E+00 |

TABLE 6

| | D8 | D12 | D18 | D22 |
|---|---|---|---|---|
| Wide-mode | 0.5 | 16.5017 | 4.880743 | 1.027321 |
| | 6.50239 | 10.49931 | 3.007127 | 2.900937 |
| Middle-mode | 10.49015 | 6.511558 | 1.208886 | 4.699178 |
| | 12.43742 | 4.564286 | 0.30578 | 5.602285 |
| Tele-mode | 15.1017 | 1.9 | 0.2 | 5.708065 |

FIGS. 9A through 11C illustrate longitudinal spherical aberration, astigmatism, and distortion aberration, respectively, at the wide-mode, the middle-mode, and the tele-mode of the zoom lens system of FIGS. 8A-8C. In an astigmatic field curve about a curvature of image field, a dotted line denotes tangential astigmatism, and a solid line denotes sagittal astigmatism. The longitudinal spherical aberration is shown with respect to light having wavelengths of about 656.28 nm, about 587.56 nm, about 546.07 nm, about 486.13 nm, and about 435.84 nm, and the astigmatism and the distortion aberration are shown with respect to light having a wavelength of about 546.07 nm.

Figure 14A:
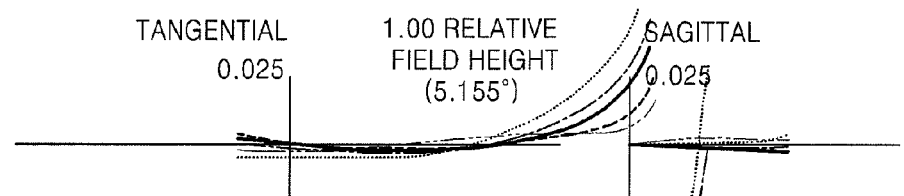
FIG. 14A-14E illustrate comma aberration at the tele-mode of the zoom lens system of FIGS. 8A-8C, according to an exemplary embodiment.
Figure 14B:
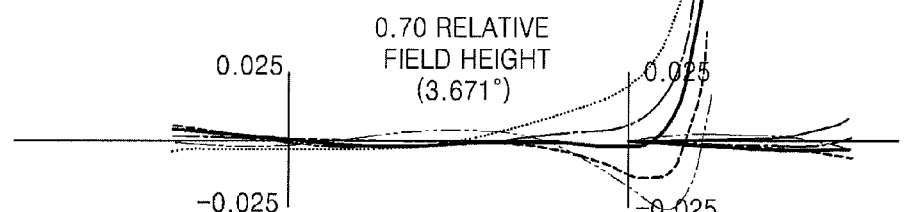
Figure 14C:
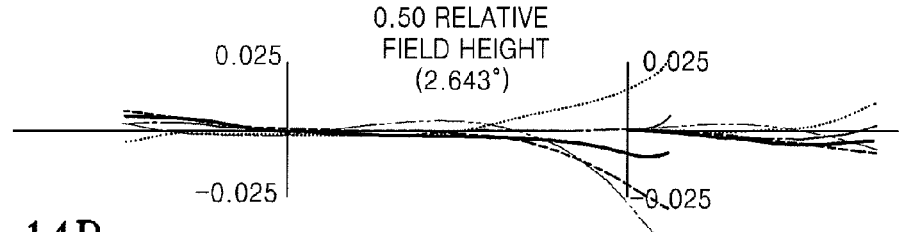
Figure 14D:
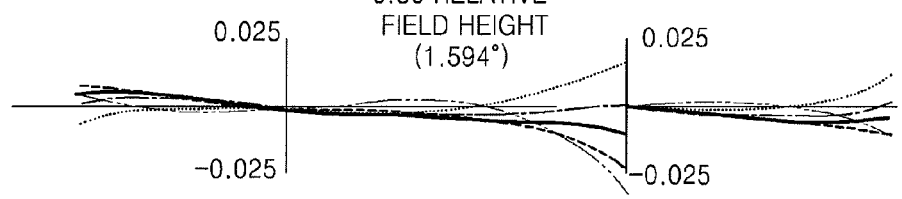
Figure 14E:
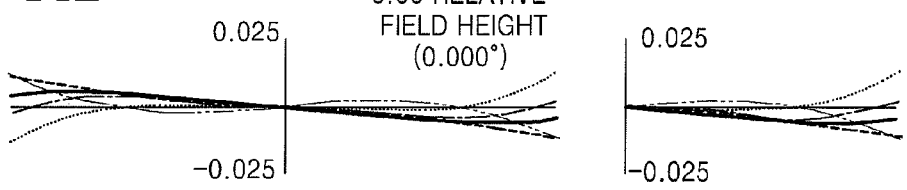

FIGS. 12A through 14E illustrate comma aberration at the wide-mode, the middle-mode, and the tele-mode of the zoom lens system of FIGS. 8A-8C. In FIGS. 12A through 12E, 13A through 13E, and 14A through 14E, left graphs show tangential comma aberration, and right graphs show sagittal comma aberration. Meanwhile, the comma aberration is comma aberration when incident angles of light incident on the zoom lens system of FIGS. 8A-8C are 33.17°, 24.20°, 17.55°, 10.62°, and 0°.

Table 7 shows that the zoom lens systems of FIGS. 1A-1C and FIGS. 8A-8C satisfy the above expressions (1) through (8).

TABLE 7

| | Eq. 1 | Eq. 2 | Eq. 3 | Eq. 4 (Eq. 5) | Eq. 6 | Eq. 7 | Eq. 8 |
|---|---|---|---|---|---|---|---|
| Zoom Lens System of FIGs. 1A-1C | 1.81 | 6.65 | 13.75% | 8.787 | 63.899 | 1.484630 | 1.38376 |
| Zoom Lens System of FIGs. 8A-8C | 1.81 | 6.65 | 13.83% | 8.826 | 63.799 | 1.484630 | 1.70665 |

According to the exemplary embodiments, a space for an aperture may be secured by only moving two lens groups during zooming. For example, when a zoom lens system is used in a photographing apparatus, such as a CCTV, a sufficient space may be secured between a second lens group and a third lens group for a thick aperture unit to be disposed.

Also, the zoom lens system may be miniaturized via a relatively short overall length, and relatively high magnification and relatively high resolution may be realized by using an aspheric and relatively high refractive lens.

In addition, the zoom lens system may have relatively high optical performance while having a relatively long back focal length. Accordingly, it is easy to dispose or exchange a filter between a lens closest to an image and an image plane.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens system comprising, in an order from an object to an image:
    a first lens group comprising at least one lens and a refraction member for bending an optical axis, and having positive refractive power;
    a second lens group having negative refractive power;
    a third lens group; and
    a fourth lens group,
    wherein zooming is performed by changing at least one interval between the first through fourth lens groups, and the zoom lens system satisfies expressions below:

$Fno\_w \leq 2.0$, $5.5 \leq f_T/f_W$, and $7.5\% \leq BFL/OAL$, wherein Fno_w denotes an F-number at a wide-mode, $f_T$ denotes an overall focal length at a tele-mode, $f_W$ denotes an overall focal length at the wide-mode, BFL denotes a back focal length of the zoom lens system, and OAL denotes an overall length of the zoom lens system from a center of a lens surface of a lens closest to the object to an image plane of the image.

2. The zoom lens system of claim 1, satisfying an expression below:

$13.7\% \leq BFL/OAL$.

3. The zoom lens system of claim 1, satisfying an expression below:

$$BFL \geq 6 \text{ mm},$$

wherein BFL denotes the back focal length at the wide-mode.

4. The zoom lens system of claim 1, satisfying an expression below:

$$BFL \geq 8 \text{ mm}$$

wherein BFL denotes the back focal length at the wide-mode.

5. The zoom lens system of claim 1, satisfying an expression below:

$$OAL \leq 65 \text{ mm}.$$

6. The zoom lens system of claim 1, satisfying an expression below:

$$1.7 \leq Fno\_w \leq 2.0.$$

7. The zoom lens system of claim 1, satisfying an expression below:

$$5.5 \leq f_T/f_W \leq 7.5.$$

8. The zoom lens system of claim 1, wherein, when the zooming is performed from the wide-mode to the tele-mode, the second and fourth lens groups move and the first and third lens groups are fixed.

9. The zoom lens system of claim 1, wherein the third lens group has positive refractive power.

10. The zoom lens system of claim 1, wherein the fourth lens group has positive refractive power.

11. The zoom lens system of claim 1, wherein the first lens group comprises at least one aspheric surface.

12. The zoom lens system of claim 1, wherein the fourth lens group comprises a positive lens and a negative lens in an order from the object to the image.

13. The zoom lens system of claim 12, wherein a lens of the fourth lens group closest to the object has at least one aspheric surface.

14. The zoom lens system of claim 12, wherein the positive lens of the fourth lens group satisfies an expression below:

$$Nd < 1.5,$$

wherein Nd denotes a refractive index of the positive lens of the fourth lens group.

15. The zoom lens system of claim 1, wherein the third lens group comprises a cemented lens formed of a positive lens and a negative lens.

16. The zoom lens system of claim 1, further comprising an aperture disposed between the second lens group and the third lens group.

17. The zoom lens system of claim 1, wherein the second lens group comprises a plurality of lenses including a first lens closest to the object and a second lens second closest to the object which satisfy an expression below:

$$1.35 < f9/f11 < 1.75,$$

wherein f9 denotes a focal length of the first lens, and f11 denotes a focal length of the second lens.

18. The zoom lens system of claim 17, wherein the second lens is a cemented lens formed of a negative lens and a positive lens.

19. A zoom lens system comprising, in an order from an object to an image:
   a first lens group comprising at least one lens, and a refraction member for bending an optical axis, and having positive refractive power;
   a second lens group having negative refractive power;
   a third lens group; and
   a fourth lens group,
   wherein zooming is performed by changing at least one interval between the first through fourth lens groups, and a total number of lenses forming the first through fourth lens groups is less than or equal to 10, and
   wherein the zoom lens system satisfies an expression below:

$$BFL \geq 8 \text{ mm}$$

wherein BFL denotes the back focal length at the wide-mode.

20. A zoom lens system comprising, in an order from an object to an image:
   a first lens group comprising at least one lens, and a refraction member for bending an optical axis, and having positive refractive power;
   a second lens group having negative refractive power;
   a third lens group; and
   a fourth lens group,
   wherein zooming is performed by changing at least one interval between the first through fourth lens groups, and a total number of lenses forming the first through fourth lens groups is less than or equal to 10, and
   wherein the zoom lens system satisfies an expression below:

$$Fno\_w \leq 2.0, \text{ and}$$

$$7.5\% \leq BFL/OAL,$$

wherein Fno_w denotes an F-number at a wide-mode, BFL denotes a back focal length of the zoom lens system, and OAL denotes an overall length of the zoom lens system from a center of a lens surface of a lens closest to the object to an image plane of the image.

* * * * *